United States Patent
Brassier et al.

(10) Patent No.: US 6,185,189 B1
(45) Date of Patent: Feb. 6, 2001

(54) METHOD FOR ADAPTING COMMITTED INFORMATION RATE OVER FRAME RELAY SWITCHED NETWORK

(75) Inventors: Rene Brassier, Nice; Denis Esteve, Vence; Jean-Pierre Maree, St. Jeannet; Pascal Thubert, Vence, all of (FR)

(73) Assignee: International Business Machines Corporation, Armonk, NY (US)

( * ) Notice: Under 35 U.S.C. 154(b), the term of this patent shall be extended for 0 days.

(21) Appl. No.: 09/093,971

(22) Filed: Jun. 9, 1998

(30) Foreign Application Priority Data

Jun. 13, 1997 (EP) .................................................. 97480036

(51) Int. Cl.$^7$ ................................................. H04L 12/26
(52) U.S. Cl. ........................................... 370/236; 370/252
(58) Field of Search .................................... 370/229, 230, 370/231, 232, 233, 234, 235, 236, 237, 238, 242, 244, 252, 253, 465, 468, 477

(56) References Cited

U.S. PATENT DOCUMENTS

| | | | | |
|---|---|---|---|---|
| 5,400,329 | * | 3/1995 | Tokura et al. ........................ | 370/232 |
| 5,426,635 | * | 6/1995 | Mitra et al. ........................... | 370/229 |
| 5,457,687 | * | 10/1995 | Newman ............................... | 370/232 |
| 5,600,798 | * | 2/1997 | Cherukuri et al. .................... | 709/232 |
| 5,719,853 | * | 2/1998 | Ikeda .................................... | 370/229 |
| 5,734,654 | * | 3/1998 | Shirai et al. .......................... | 370/396 |
| 5,768,271 | * | 6/1998 | Seid et al. ............................. | 370/389 |
| 5,781,532 | * | 7/1998 | Watt .................................... | 370/236 |
| 5,909,443 | * | 6/1999 | Fichou et al. ........................ | 370/412 |
| 5,912,877 | * | 6/1999 | Shirai et al. .......................... | 370/228 |

OTHER PUBLICATIONS

"Congestion Control Strategies for Mixed X.25/Frame Relay Networks" by A.J. Vernon, T. Jawor, S. Rabie, D. Whiting & H. Badran XP000438768, Jan. 5, 1994, Bell–Northern Research, Ontario Canada.
"A Rate–Based Congestion Avoidance and Control Scheme for Packet Switched Networks" by D. E. Comer, R. S. Yavatkar XP000166240, 1990 IEEE, pp. 390–397.
"On the Performance of Submitting Excess Traffic to ATM Networks" by B. A. Makrucki, XP000325986, Feb. 12, 1991, BellSouth Telecommunications, Globecom '91, 1991 IEEE.

* cited by examiner

Primary Examiner—Chi H. Pham
Assistant Examiner—Kwang B. Yao
(74) Attorney, Agent, or Firm—John B. Frisone; Joscelyn G. Cockburn

(57) ABSTRACT

The Committed Information Rate (CIR) functionality is converted to an Adaptive Rate Base (ARB) mechanism. The solution is based on the interaction between a proactive setting of the Explicit Congestion Notifications (ECN) in the Frame Handler (FH) function of the switches and a converging Adaptive CIR algorithm in the Terminal Equipments. The result of this interaction is that when a logical bottleneck is in the process of settling in a switch, the CIR at the Terminating Equipment adapts itself to the throughput of the forming logical bottleneck. Henceforth, the logical bottleneck is exported at the boundary of the network within the Terminating Equipment. The end result is that the data sent by the data link control in the Terminating Equipment is paced so that the output matches that of the weakest point in the network, keeping it busy but not congested.

5 Claims, 3 Drawing Sheets

Frame Relay Network components

Adaptive vs Variable CIR

FRTE CIR Adjustment

METHOD FOR ADAPTING COMMITTED INFORMATION RATE OVER FRAME RELAY SWITCHED NETWORK

FIELD OF INVENTION

The present invention relates to high speed data networking and, more particularly, to the interconnection, for bandwidth allocation and control, between Terminating Equipments (TE) and Frame Handlers (FH) in a Frame Relay (FR) switched network by adapting the committed information rate (CIR).

BACKGROUND ART

The present invention makes references to the following standards:

ANSI T1.617, T1.618 and T1.606 (addendum); and
ITU-T Q933 and Q922

The terminology that is used throughout the description is as follows:

FR:Frame Relay is dedicated to High speed switched networks.
FH:Frame Handler concerns the function of FR layer 2 that handles frame switching in the network.
TE:Terminating Equipment is a gateway from FR, it handles upper layer 2 and layer 3 functions.
Bc:Committed Burst size is the number of bytes that can be sent in a burst according to Committed Information Rate.
Be:Excess Burst size is the additional bytes to Bc that may or may not be carried by the network.
Tc:Period over which Bc is sent, its value is generally computed according to the formula CIR=Bc/Tc.
CIR:Committed Information Rate which represents a bit rate that is subscribed from a carrier.
V_CIR:Variable CIR which is the classical recommendation according to the standard organizations as mentioned above.
A_CIR:Adaptive CIR is the main object of this invention.
ARB:Adaptive Rate Base represents the ability to perform flow control by adapting a transmission rate.
PVC:Permanent virtual channel is a leased end to end path through the FR network.
DLCI:Data Link Control Identifier which identifies a PVC over a given hop.
ECN:Explicit Congestion Notification where a bit is piggy-backed in FR Q922 header to notify of a congestion (which happens generally in the FH function). The ECN uses the pair FECN/BECN of congestion management.
FECN:Forward ECN. Generally set by Frame Handler function in a frame that passes through a congested node and sends a signal to the receiving or destination FRTE, advising it to slow down the receipt of information.
BECN:Backward ECN. Flows on the way back from which the congestion was experienced to the source FRTE of the traffic in order to pace it down.
Bottleneck:The node or the line in the network that limits the throughput over a PVC. Both the bottleneck location and its throughput are subject to change overtime.
LAN:Local Area Network, it interconnects stations over a single plant (campus). Tendency is to go from the old shared media model to a switched model to have higher throughput.
WAN:Wide Area Network, everything from the most common modem in a PC to a Serial Optical Network. It interconnects stations and LANs over long distance serial links.

Frame Relay technology has past succeeded over the past years in becoming the major multiprotocol (IP for intra/internet, SNA, SNAP . . . ) Wide Area Network (WAN) for interconnecting Local Area Networks (LAN) of a company's dispersed sites.

Frame Relay is a switched multiplexed technology, which means in other words that many end to end communications can share a given node or a given link without knowing each other.

The load of that given node or link may thus change dramatically over time when huge data exchanges are asynchronously started. Preventing overuse of network resources is thus a major issue. Frame Relay uses Explicit Congestion Notifications to let FRTEs know about a congestion somewhere over a PVC path. The FRTE is responsible for diminishing its throughput till the congestion in the network terminates, through flow control operations.

The definition of objectives and requirements for congestion management is provided in addendum 1 of ANSI T1.606. This standard defines speed and burstiness and describes how the network and the FRTE devices handle an overabundance of data traffic. Congestion occurs when traffic arriving at a resource exceeds the network's capacity. It can also occur for other reasons (equipment failure etc.). Network congestion affects the throughput, delay, and frame loss experienced by the FRTE. The latter should therefore reduce its offered load in the face of network congestion.

When links or nodes in the network are overused, logical bottlenecks tend to form and move throughout the network. A logical bottleneck becomes the place where most of the outstanding data get queued, increasing latency and causing memory storage where it is most unwanted and expensive. When network access speed increases, larger windows are needed and more multiplexing takes place. At some level, the bottleneck cannot keep up and starts discarding frames, which in turn reduces traffic dramatically.

The movement of data through a network sometimes needs traffic signs to indicate when it should stop and go. Access signaling described in the ANSI T1.617, CCITT Q.933, specifies a protocol for establishing and releasing switched frame relay virtual calls and provides a means to inform users of permanent virtual circuits of failure and restoration.

Explicit Congestion Notifications (ECN) by the network are generally a reactive process intended to protect the network nodes. Forward ECN (FECN) and Backward ECN (BECN) are the most common congestion management signals.

Adaptive Rate Based (ARB) protocols are the modern solution to replace window based protocols. Whereas the window based protocols transfer a number of frames and then wait for an acknowledgement, the ARB protocols send a continuous binary flow at a given rate.

Frame relay networks provide a Committed Information Rate (CIR) that is a kind of rate enforcement, refer to the ITU-T X36, but the CIR is still not adaptive. The CIR is the rate (expressed in bits per second) at which the data are transferred between the user equipment and the network.

CIR standard provides a speed range between the committed and excess rates that the terminating equipment can use depending on whether the network reports a congestion or not. In order to adapt to the dynamics of transient logical bottlenecks, the Committed Information Rate should be able to vary within that range. Any implementation that uses a static CIR is bound to be obsolete.

Moreover, in the existing implementations, the ECN are used in a reactive way, meaning that the FECN and BECN are set when a congestion has already occurred. Should the occasion arises, the network enters a slow down condition to recover. In consequence, it is not possible to obtain a fine tuning of the rate at the end point (FRTE). This is why the congestion notification should be issued as soon as the conditions are reached that would lead to a congestion, but before it creates any damage.

Existing implementations try to create a Variable CIR but:

There is no convergence in the algorithm,

A Terminating Equipment (TE) cannot achieve any rate tuning by itself. A cooperation between the switches (FRFHs) AND the end points (FRTEs) as a system is required to achieve a real rate tuning.

The problem addressed here is how to improve that current CIR technique in order to turn it into a rate control and to optimize the throughput to the network to match the logical bottleneck capacity.

OBJECT OF THE INVENTION

The main object of the present invention is to improve the Committed Information Rate (CIR) functionality in order to turn it into an Adaptive Rate Base (ARB) mechanism, so as to apply it to frame relay networks.

The solution is based on the interaction between a proactive setting of the Explicit Congestion Notifications (ECN) in the Frame Handler (FH) function of the switches and a converging Adaptive CIR algorithm in the Terminal Equipments.

The result of this interaction is that when a logical bottleneck is in the process of settling in a switch, the CIR at the Terminating Equipment adapts itself to the throughput of the forming logical bottleneck. Henceforth, the logical bottleneck is exported at the boundary of the network, within the Terminating Equipment.

The end result is that the information sent by the data link control in the Terminating Equipment is paced so that the output matches that of the weakest point in the network, keeping it busy but not congested.

SUMMARY OF THE INVENTION

The Frame Relay Terminating Equipment (FRTE) and the Frame Relay Switching Equipment (FRSE, also called Frame Handler) must be considered as a system.

Before reaching any kind of buffer, queue, or throughput limitation, the Frame Handler (FRSE) will decide whether it is in the process of becoming a logical bottleneck as soon as it:

receives more data to transmit than it can actually send according to current Committed Information Rate over a short period of time; or introduces a given amount of delay on the traffic for a given Data Link Control Identifier (DLCI).

In both cases, the Frame Handler sets Forward Explicit Congestion Notifications (FECN) on the traffic for that Data Link Control Identifier, which is echoed by the remote Frame Relay Terminating Equipment (FRTE) as a Backward Explicit Congestion Notification (BECN). The Frame Handler can also set BECNs, on the first opportunity in case the traffic flows in the other way.

When the Frame Relay Terminating Equipment receives a BECN, it reduces its Committed Information Rate (CIR). If it does not receive any BECNs, it increases the CIR.

There are two important things that make the CIR adaptive and converging:

The increment is dynamic, so that the Committed Information Rate settles close to the optimum value. It starts with a minimum value and gets longer and longer until the CIR crosses the optimum value. At that point, the CIR is set back to about the last value under the optimal point, and the increment becomes minimum again. When the CIR is close to the optimum value, the increment should stay at the lowest value but its sign should change all the time.

The rate is changed at a time base of at least the Turn Around Time (TAT) of the network, so that the effect of the previous tuning can be detected. For instance, a fair value for the TAT is the retry timer of the Data Link Control, if the TAT cannot be measured dynamically. The time base may be much greater than the TAT in order to take account of the damping effect of the queues in the network if some switches do not implement proactive congestion detection.

DETAILED DESCRIPTION OF THE INVENTION

Let us first discuss the role of the switches in the system according to the present invention. It is very important that they detect an upcoming congestion before queues build up and delays are introduced in the traffic.

Figure 1:
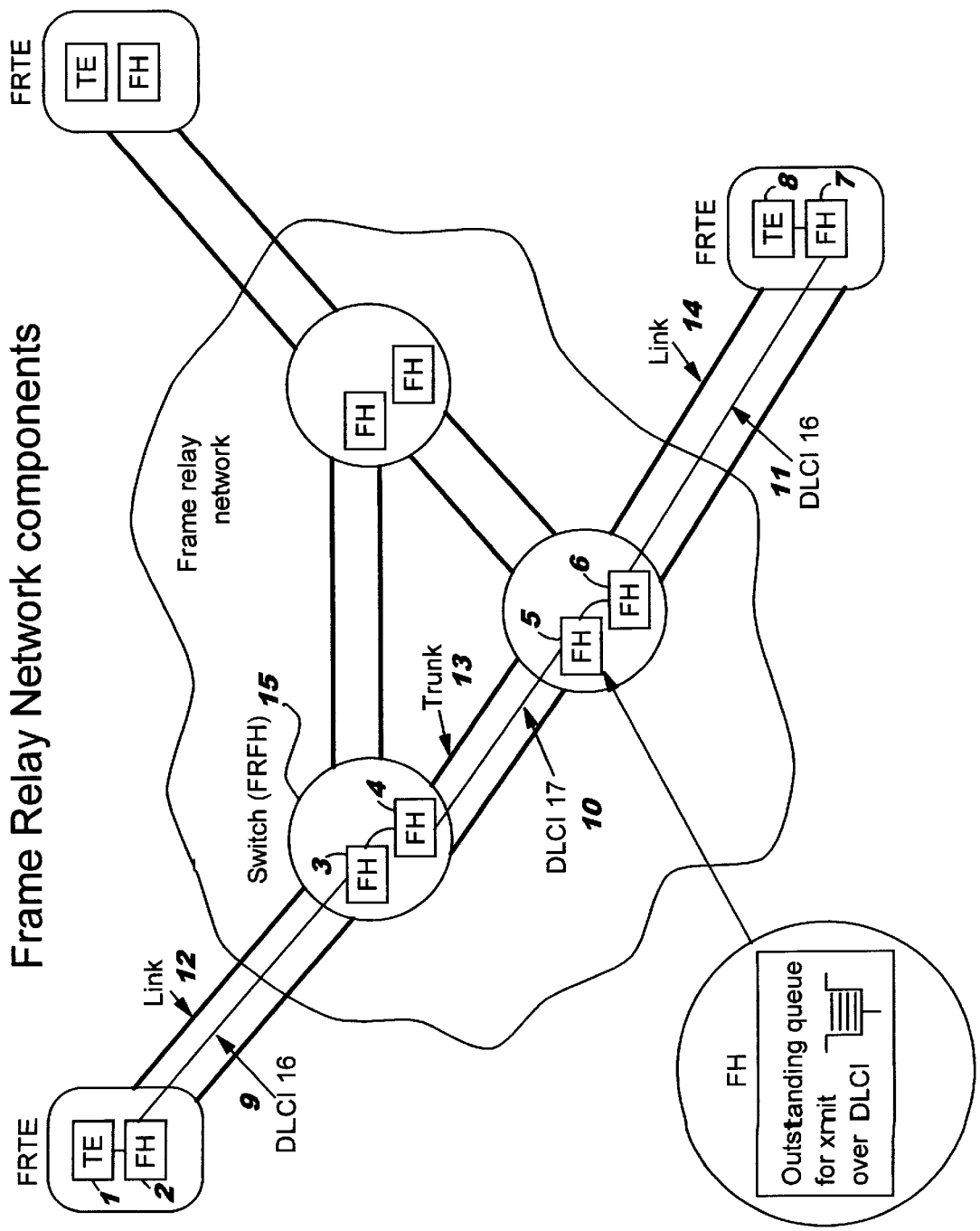
FIG. 1 illustrates a block diagram of a components in the Frame relay network according to the present invention.

A Frame Relay Switch (15) consists of pairs of partner Frame Handler subports (3,4) and (5,6) as shown in FIG. 1. Each partner corresponds to a given Data Link Control Identifier referred as DLCI over a different physical line, for instance the partner (3) corresponds to the DLCI 16 (9) over the physical link (12). The Frame Handler subports are associated like a logical jumper between the DLCIs so that every frame received by a subport is passed to its partner to be retransmitted. A successive interconnection of switches (15) and Data Link Control Identifiers (10) creates an end to end Permanent Virtual Channel.

To be proactive in its congestion detection, a subport (3,4,5,6) measures the traffic received from its partner (i.e. 3 is the partner of 4) and enqueued in outstanding queue over the last Tc period. If the measured traffic is greater than the current burst allowed by CIR, some of the frames for that DLCI will be stamped with FECNs.

The number of ECNs set does not have a large affect on the FRTE since most implementations integrate ECNs over time as a single information. Thus, instead of measuring the number of bytes queued, the variation of that information is used as a primary congestion indicator.

FECNs are also set if the delay introduced by queuing packets in the FH passes a predefined Threshold, that depends on CIR value.

Now that the FRFH sets ECNs in a proactive way, the FRTE needs to use that information to send as much as the FH can handle—but not more—. The invention allows the convergence of the CIR as illustrated in FIG. 2.

Figure 2:
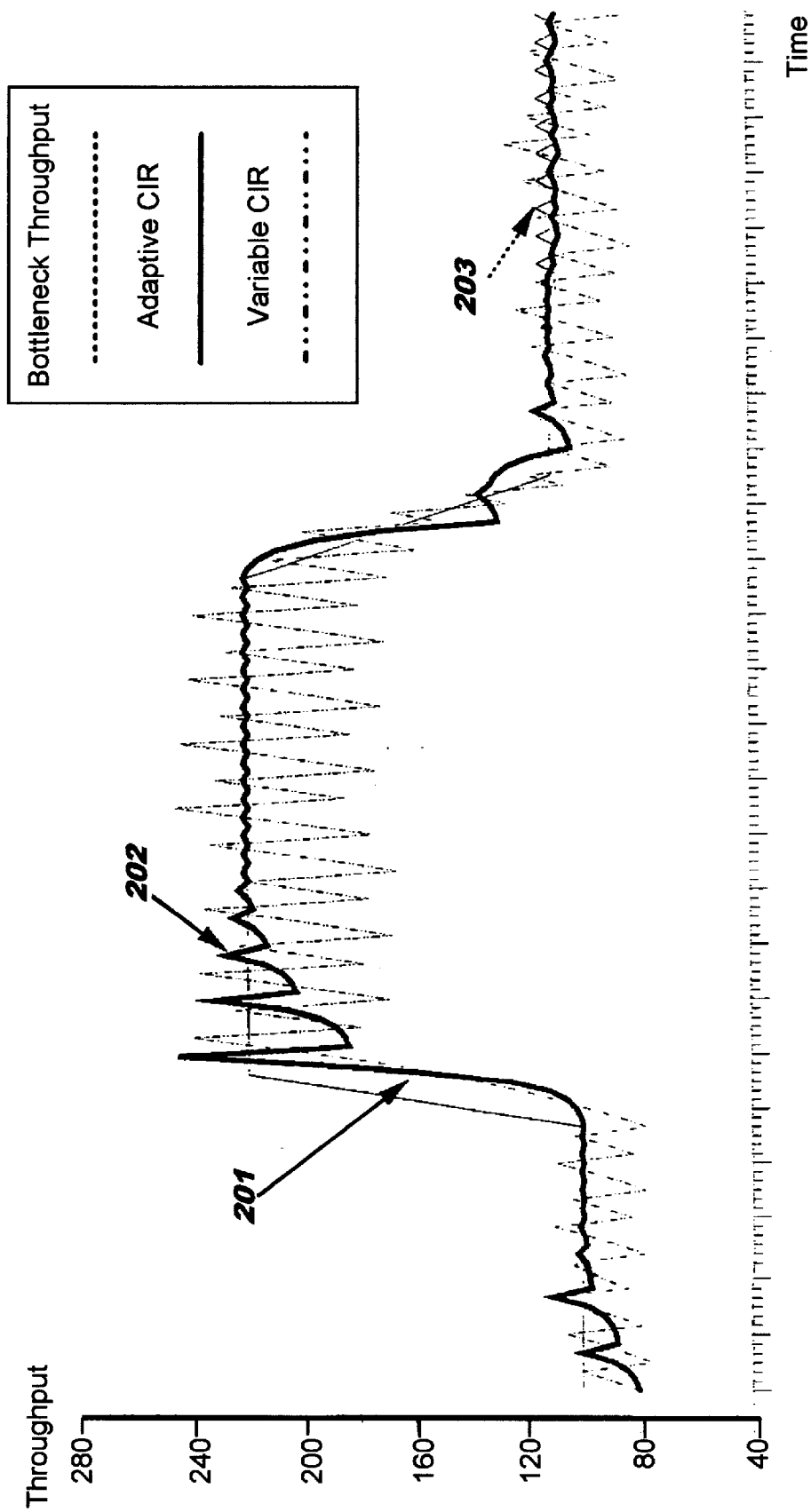
FIG. 2 compares the reaction of traditional Variable CIR versus the Adaptive CIR according to the present invention, in case of dynamic variation of the available throughput for a PVC over time.

FIG. 2 shows a simulation of a change in the available throughput for a Permanent Virtual Channel (PVC). Variable CIR parameters are set to 12 percent increment and 25 percent decrement, which are common defaults that exist in the marketplace.

The throughput (201) shows that Adaptive Committed Information Rate (A-CIR) converges to a new value which can be very fast thanks to the exponential curve. As is shown, the optimum curve is crossed faster than that of the Variable Committed Information Rate (V-CIR) shown in dots line.

The throughput (202) illustrates the damping of the Adaptive CIR around the optimum reached.

The throughput (203) shows the existing of some 'noise', i.e. certain irregularities are added on the optimum. In this part, the Adaptive CIR converges to the lowest level of that noise so that the network is never overused.

Figure 3:
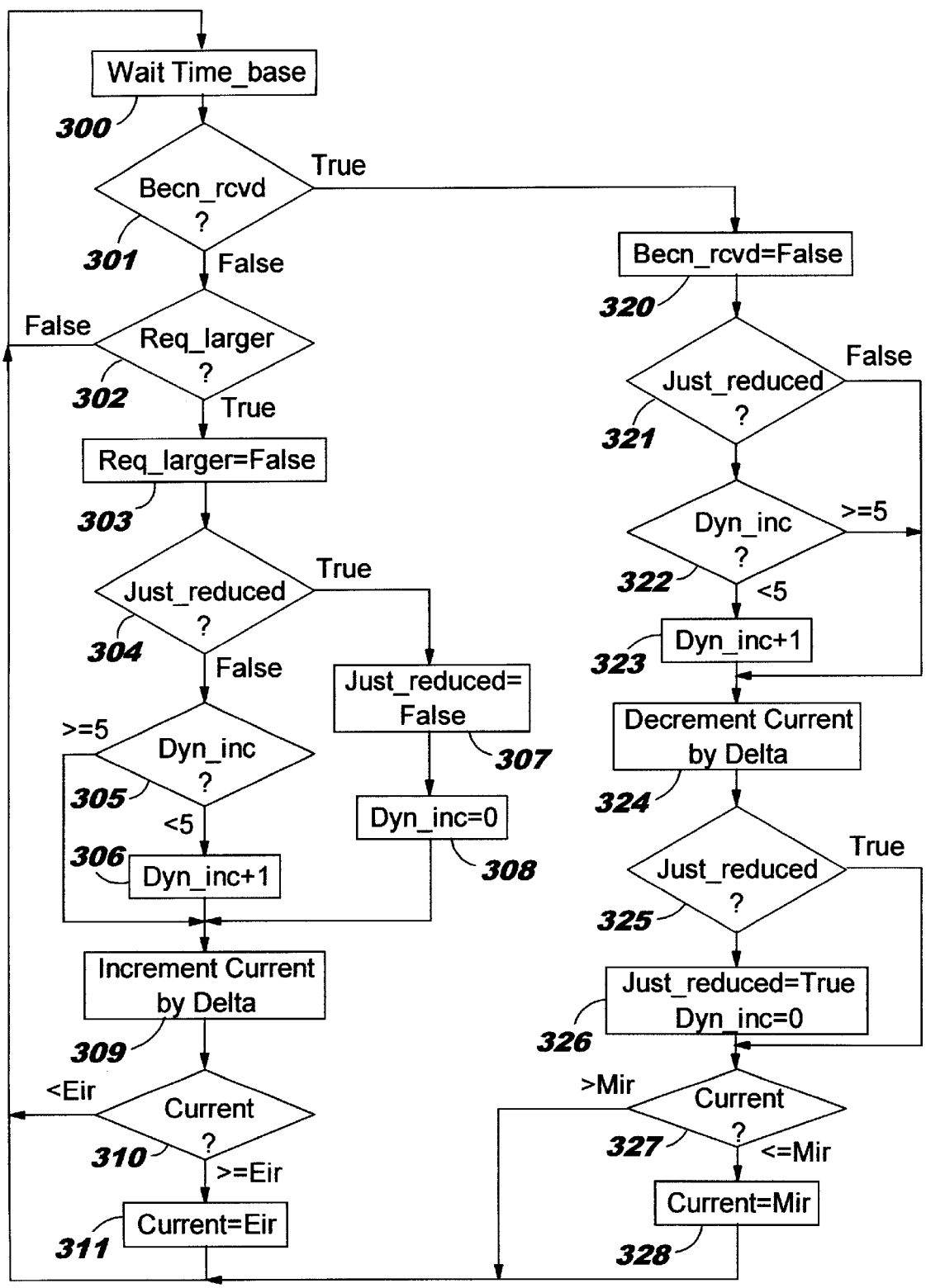
FIG. 3 is a flow-chart illustrating the FRTE dynamic CIR adjustment according to the present invention.

FIG. 3 details the algorithm used for adapting the CIR to the network capability the results of which are shown in FIG. 2.

For this algorithm, several values are configured and act as constants:
- a minimum information rate (MIR) which is the minimum value for Adaptive CIR;
- a Excess Information Rate (EIR) which is the maximum value for Adaptive CIR;
- a PRECISION which determines how close to the Frame Handler throughput the algorithm is expected to converge and how fast it reaches the correct value (ranges 6 to 10). Value 7 is used in FIG. 2; and
- a TIME_BASE which specifies how often CIR is updated. Default is 3.2 seconds.

Several variables are also defined for the algorithm:
- a CURRENT is the current value for the Committed Burst size (Bc), which is the number of bytes that can be sent over a Tc period. This is what is to be adjusted by referring to the network Explicit Congestion Notifications;
- a DYN_INCREMENT is a variable that changes at each iteration by either being reset to zero or incremented by 1. The Maximum value for DYN_INCREMENT is 5;
- a DELTA is the amount by which CURRENT is incremented or decremented. DELTA is computed from CURRENT and DYN_INCREMENT:

DELTA=CURRENT>>(PRECISION—DYN_INCREMENT);

where>> is a binary shift right.

In other words, DELTA is CURRENT divided by 2 at the power of (PRECISION minus DYN_INCREMENT). DELTA is at the minimum when DYN_INCREMENT is NULL and it is multiplied by 2 each time DYN_INCREMENT is incremented by 1;
- a BECN_RECEIVED is a flag that is raised when a frame with a BECN is received;
- a JUST_REDUCED is a flag that is raised when CURRENT is decremented; it is reset when CURRENT is incremented to keep track of the last action performed against CURRENT; and
- a REQUEST_LARGER_CIR is a flag that is raised when the CURRENT value is not enough versus the traffic passed from the upper layer.

At INIT time, CURRENT is set to the committed burst size (Bc) and DYN_INCREMENT is set to 0.

In RUN time, two processes operate in flip flop mode, being separated by half of TIME_BASE.

Process 1 resets BECN_RECEIVED to sweep information that may not represent the latest change in CURRENT. This is run at the first half TIME_BASE and then every TIME_BASE. This is actually optional but may improve the algorithm response in the case of high latency networks.

Process 2, represented in FIG. 3, increments or decrements CURRENT based on whether BECN_RECEIVED is set or not, at step (301). If the current process does not modify the JUST_REDUCED flag, that means that we need to keep on changing the computed value of CIR in the same way (by incrementing or decrementing the CURRENT variable). DYN_INCREMENT is incremented by 1 so that DELTA doubles and CURRENT changes exponentially.

FIG. 3 illustrates in greater detail the method of CIR adaptation implemented in the Frame Relay Terminating Equipment:

At every TIME_BASE (300):

If no BECN was received at step (301), the CURRENT (CIR) is lower than the end to end network capability, so it will be increased in the process, unless more bandwidth is not needed.

At step (302), if REQUEST_LARGER_CIR flag is not raised, CURRENT value is left unchanged. The reason is that CURRENT is not currently used up so there is no way to determine whether the network could support as much as CURRENT. Incrementing CURRENT is thus useless and dangerous too.

At step (303) the REQUEST_LARGER_CIR flag is reset.

At step (304), since no BECN was received and if JUST_REDUCED is raised, this means that we start incrementing CURRENT after having decremented it.

At step (307), the JUST_REDUCED flag is reset since CURRENT is in the process of being increased.

At step (308) DYN_INCREMENT is reset to zero before DELTA is computed. (As a remark, this is opposed to step (324) where DELTA is computed before DYN_INCREMENT is reset to zero. The reason is that the system is expected to leave CIR below the network capability, as much as possible. Therefore, incrementing CURRENT is always in slow start mode while decrementing starts by returning to the previous value, which was supposed to be under the optimal value for CURRENT, and then resetting DYN_INCREMENT).

At steps (305) and (306), the DYN_INCREMENT is incremented if it does not reach the maximum value of 5. Another value than 5 may used depending on the pace of convergence that is desired.

At step (309), the computation of DELTA according to the formula mentioned above enables to increase the CURRENT value.

At steps (310) and (311), the CURRENT value is tested so as to be limited by the maximum value for Adaptive CIR (EIR), Afterwards, the algorithm loops back to step (300) where it waits for another time_base.

Step (320) is not necessary if process 1 is run. It consists in resetting the BECN_RECEIVED flag. The process is now to reduce the CURRENT value of CIR.

At steps (321), (322) and (323), the DYN_INCREMENT is incremented if it does not reach the maximum value of 5 and if the previous process was also to reduce the CURRENT value of CIR (JUST_REDUCED must be raised).

At step (324), the computation of DELTA according to the formula mentioned above enables to reduce the CURRENT value.

At steps (325) and (326), if the previous process was not to reduce the CURRENT value of CIR (JUST_REDUCED must be reset), JUST_REDUCED is set and the DYN_INCREMENT is reset to zero.

At steps (327) and (328), the CURRENT value is tested so as to be limited by the minimum value for Adaptive CIR (MIR), Afterwards, the algorithm loops back to step (300) where it waits for another time_base.

The present invention directly applies to the internet as long as the IP traffic is carried over a frame relay backbone. The FRTE in the internet server will be able to pace its sending rate up to the optimal throughput the frame relay network can support.

The invention is not limited to this specific implementation. It can also apply to a system composed of a data overflow sensor and an tunable source so as to optimize the amount of data emitted.

For instance, an internet server could limit its transmit throughput up to the network capability to deliver data to an end user, as opposed to sending large quantities of data that load the network. This would require a sensor of some kind placed in the boundaries of the internet in front of the low speed lines that serve most end users modems, in order to limit the congestion at that point.

Another example can be a work load manager that shares tasks among a set of processors that are distributed over a network. The manager issues orders to the processors at a given rate that is supposed to match a processor capability to execute these orders. If the processor starts receiving more orders than it can achieve, it will send a back pressure signal to the manager within the response to an order. The manager will reduce the rate of orders sent to the processor that is overloaded. A processor that is shared between several managers has to slow down its execution rate for the current active managers when a new manager starts using its resources.

What is claimed is:

1. In a data communication network including a number of terminating equipments (TE) each connected to one of a plurality of frame handlers (FH) by a data link control identifier (DLCI), a method for controlling the bandwidth allocated to communications between the TEs comprising the steps:

at each of said FHs setting an Explicit Congestion Notification (ECN) which includes a burst size (Bc) when the FH receives more data to transmit than it can transmit or if the FH has imposed a delay on network traffic received from a DLCI;

periodically at each TE;

determining if an ECN has been received;

if an ECN has not been received;

determining if the CIR is in an increasing mode and if it is, exponentially increasing the burst size until the CIR exceeds a predetermined maximum value and then changing to a decreasing mode;

determining if the CIR has just ended a decreasing mode and if it has, slowly increasing the burst size;

if an ECN has been received, returning the burst size to its previous value if it has just increased and reducing the burst size exponentially if the CIR continues in a decreasing mode; and repeating the above steps in subsequent time periods.

2. In a data communication network including a number of terminating equipments (TE) each connected to one of a plurality of frame handlers (FH) by a data link control identifier (DLCI), a method for controlling the bandwidth allocated to communications between the TEs comprising the steps:

at each of said FHs setting an Explicit Congestion Notification (ECN) bit when the FH receives more data to transmit than it can transmit or if the FH has imposed a delay on network traffic received from a DLCI;

at each of the TEs periodically determining if an ECN has been received;

incrementing the CIR by a first dynamically derived amount that is a function of the state of a prior reduction of the CIR if additional bandwidth is needed if an ECN was not received during the period, and decrementing the CIR by a second dynamically derived amount which is a function of the state of a prior reduction of the CIR if an ECN was received during the period.

3. The method set forth in claim 2 in which the dynamic increase of the CIR is not allowed to exceed an Excess Information Rate (EIR) and the dynamic decrease of the CIR is not allowed to fall below a Minimum Information Rate (MIR).

4. The method set forth in claim 3 in which:

the CIR is incremented in a period in which an ECN was not received only if it had not been decremented in the prior period and the amount by which the CIR is to be incremented is increased from the amount determined in the prior period; and the CIR is decremented in a period in which an ECN was received, by an amount derived in the prior period if it had not been reduced in the prior period and reduced by an amount derived in the prior period augmented by a predetermined value if it had been reduced in the prior period.

5. In a data communication network including a number of terminating equipments (TE) each connected to one of a plurality of frame handlers (FH) by a data link control identifier (DLCI), a method for controlling the bandwidth allocated to communications between the TEs comprising the steps:

at each of said FHs setting an Explicit Congestion Notification (ECN) bit when the FH receives more data to transmit than it can transmit or if the FH has imposed a delay on network traffic received from a DLCI;

at each of the TEs periodically determining if an ECN has been received and incrementing the CIR in a period in which ECN was not received only if it had not been decremented in the prior period and the amount by which the CIR is to be incremented is increased from the amount determined in the prior period; and decrementing the CIR in a period in which ECN was received by an amount derived in the prior period if it had not been reduced in the prior period and reduced by an amount derived in the prior period augmented by a predetermined value if it had been reduced in a prior period, wherein the amount for the decrementing or incrementing is derived dynamically.

* * * * *